(12) United States Patent
McCourt

(10) Patent No.: US 12,230,253 B2
(45) Date of Patent: Feb. 18, 2025

(54) AUTOMATIC CLASSIFICATION OF PHONE CALLS USING REPRESENTATION LEARNING BASED ON THE HIERARCHICAL PITMAN-YOR PROCESS

(71) Applicant: Invoca, Inc., Santa Barbara, CA (US)

(72) Inventor: Michael McCourt, Santa Barbara, CA (US)

(73) Assignee: Invoca, Inc., West Hollywood, CA (US)

( * ) Notice: Subject to any disclaimer, the term of this patent is extended or adjusted under 35 U.S.C. 154(b) by 534 days.

(21) Appl. No.: 17/397,709

(22) Filed: Aug. 9, 2021

(65) Prior Publication Data
US 2023/0055948 A1 Feb. 23, 2023

(51) Int. Cl.
| | |
|---|---|
| *G10L 15/14* | (2006.01) |
| *G06N 20/00* | (2019.01) |
| *G10L 15/06* | (2013.01) |
| *G10L 15/08* | (2006.01) |

(52) U.S. Cl.
CPC .............. *G10L 15/14* (2013.01); *G06N 20/00* (2019.01); *G10L 15/063* (2013.01); *G10L 2015/0631* (2013.01); *G10L 2015/088* (2013.01)

(58) Field of Classification Search
CPC ................... G10L 15/14; G10L 15/063; G10L 2015/0631; G10L 2015/088
See application file for complete search history.

(56) References Cited

U.S. PATENT DOCUMENTS

| | | | | |
|---|---|---|---|---|
| 2021/0118432 A1* | 4/2021 | McCourt | ................ | G10L 15/22 |
| 2021/0118433 A1* | 4/2021 | McCourt | ............... | G10L 15/183 |
| 2021/0120121 A1* | 4/2021 | McCourt | ............... | G10L 15/197 |

FOREIGN PATENT DOCUMENTS

CA    3090143 A1 *   2/2021    ........... G06F 16/245

OTHER PUBLICATIONS

Sato, Issei, and Hiroshi Nakagawa. "Topic models with power-law using Pitman-Yor process." Proceedings of the 16th ACM SIGKDD international conference on Knowledge discovery and data mining. 2010. (Year: 2010).*

(Continued)

*Primary Examiner* — Anne L Thomas-Homescu
(74) *Attorney, Agent, or Firm* — Baker Botts L.L.P.

(57) ABSTRACT

Embodiments of the disclosed technology include a representation learning model for classification of natural language text. In embodiments, a classification model comprises a feature model and a classifier. The feature model may be hierarchical in nature: data may pass through a series of representations, decreasing in specificity and increasing in generality. Intermediate levels of representation may then be used as automatically learned features to train a statistical classifier. Specifically, the feature model may be based on a hierarchical Pitman-Yor process. In embodiments, once the feature model has been expressed as a Bayesian Belief Network and some aspect of the feature model has been selected for prediction, the feature model may be attached to the classifier. In embodiments, after training, potentially using a mix of labeled and unlabeled data, the classification model can be used to classify documents such as call transcripts based on topics of conversation represented in the transcripts.

20 Claims, 9 Drawing Sheets

(56) References Cited

OTHER PUBLICATIONS

Magnusson, Måns, Leif Jonsson, and Mattias Villani. "DOLDA: a regularized supervised topic model for high-dimensional multi-class regression." Computational Statistics 35 (2020): 175-201. (Year: 2020).*

Robert, Christian P., et al. "Accelerating MCMC algorithms." Wiley Interdisciplinary Reviews: Computational Statistics 10.5 (2018): e1435. (Year: 2018).*

Lijoi, Antonio, Igor Prünster, and Tommaso Rigon. "The Pitman-Yor multinomial process for mixture modelling." Biometrika 107.4 (2020): 891-906. (Year: 2020).*

European Patent Office, Extended European Search Report for EP 22188804.3-1203, dated Dec. 20, 2022, 12 pages.

Sato Issei et al., "Topic models with power-law using Pitman-Yor process" CIKM'10, Proceedings of the 19th International Conference on Information & Knowledge Management and Co-located Workshops, Oct. 26-30, 2010, Toronto, Ontario, Canada, ACM, New York, NY, 9 pages.

Masumura Ryo et al., "Role play dialogue topic model for language model adaptation in multi-party conversation speech recognition," 2014 IEEE International Conference on Acoustics, Speech and Signal Processing (ICASSP), IEEE, May 4, 2014, 5 pages.

Chen Changyou et al., "Differential Topic Models" IEEE Transactions on Pattern Analysis and Machine Intelligence, IEEE Computer Society, USA, vol. 37, No. 2, Feb. 1, 2015, 13 pages.

Michael Betancourt. A Conceptual Introduction to Hamiltonian Monte Carlo. arXiv e-prints, art. arXiv:1701.02434, Jan. 2017. 60 pages.

David M. Blei, Andrew Y. Ng, and Michael I. Jordan. Latent dirichlet allocation. J. Mach. Learn. Res., 3(null): 993-1022, Mar. 2003. ISSN 1532-4435. 30 pages.

Wray Buntine. Variational extensions to em and multinomial pca. In Tapio Elomaa, Heikki Mannila, and Hannu Toivonen, editors, Machine Learning: ECML 2002, pp. 23-34, Berlin, Heidelberg, 2002. Springer Berlin Heidelberg. ISBN 978-3-540-36755-0. 13 pages.

Wray Buntine and Marcus Hutter. A Bayesian View of the Poisson-Dirichlet Process. arXiv e-prints, art. arXiv:1007.0296, Jul. 2010. URLhttps://ui.adsabs.harvard.edu/abs/2010arXiv1007.0296B. 50 pages.

Wray L. Buntine and Swapnil Mishra. Experiments with non-parametric topic models. In Proceedings of the 20th ACM SIGKDD International Conference on Knowledge Discovery and Data Mining, KDD '14, pp. 881-890, New York, NY, USA, 2014. ACM. ISBN 978-1-4503-2956-9. doi: 10.1145/2623330.2623691. URL http://doi.acm.org/10.1145/2623330.2623691. 10 pages.

Changyou Chen, Lan Du, and Wray Buntine. Sampling table configurations for the hierarchical poisson-dirichlet process. In Dimitrios Gunopulos, Thomas Hofmann, Donato Malerba, and Michalis Vazirgiannis, editors, Machine Learning and Knowledge Discovery in Databases, pp. 296-311, Berlin, Heidelberg, 2011. Springer Berlin Heidelberg. ISBN 978-3-642-23780-5. URLhttp://users.cecs.anu.edu.au/~Chen.Changyou/STC_ECML.pdf. 16 pages.

S. Geman and D. Geman. Stochastic relaxation, gibbs distributions, and the bayesian restoration of images. IEEE Transactions on Pattern Analysis and Machine Intelligence, PAMI-6(6):721-741, 1984. 21 pages.

Thomas L. Griffiths and Mark Steyvers. Finding scientific topics. Proceedings of the National Academy of Sciences, 101(suppl 1):5228-5235, 2004. ISSN 0027-8424. doi: 10.1073/pnas.0307752101. URLhttps://www.pnas.org/content/101/suppl_1/5228. 8 pages.

W. K. Hastings. Monte carlo sampling methods using markov chains and their applications. Biometrika, 57(1): 97-109, 1970. ISSN 00063444. URLhttp://www.jstor.org/stable/2334940. 13 pages.

Nicholas Metropolis, Arianna W. Rosenbluth, Marshall N. Rosenbluth, Augusta H. Teller, and Edward Teller. Equation of state calculations by fast computing machines. The Journal of Chemical Physics, 21(6):1087-1092, 1953. doi: 10.1063/1.1699114. URLhttps://doi.org/10.1063/1.1699114. 6 pages.

Jim Pitman. Some developments of the blackwell-macqueen urn scheme. Lecture Notes-Monograph Series, 30: 245-267, 1996. ISSN 07492170. URLhttp://www.jstor.org/stable/4355949. 25 pages.

Y. W. Teh. A Bayesian interpretation of interpolated Kneser-Ney. Technical Report TRA2/06, School of Computing, National University of Singapore, 2006. 19 pages.

D. M. Blei and J. D. Mcauliffe. Supervised Topic Models. arXiv e-prints, art. arXiv:1003.0783, Mar. 2010. URL https://ui.adsabs.harvard.edu/abs/2010arXiv1003.0783B. 22 pages.

S. Eshima, K. Imai, and T. Sasaki. Keyword Assisted Topic Models. arXiv e-prints, art. arXiv:2004.05964, Mar. 2021. URL https://ui.adsabs.harvard.edu/abs/2020arXiv200405964E. 94 pages.

P. Flaherty, G. Giaever, J. Kumm, M. I. Jordan, and A. P. Arkin. A latent variable model for chemogenomic profiling. Bioinformatics, 21(15):3286-3293, May 2005. ISSN 1367-4803. doi: 10.1093/bioinformatics/bti515. URL https://doi.org/10.1093/bioinformatics/bti515. 8 pages.

S. Lacoste-Julien, F. Sha, and M. Jordan. Disclda: Discriminative learning for dimensionality reduction and classification. In D. Koller, D. Schuurmans, Y. Bengio, and L. Bottou, editors, Advances in Neural Information Processing Systems, vol. 21. Curran Associates, Inc., 2009. URL https://proceedings.neurips.cc/paper/2008/file/7b13b2203029ed80337f27127a9f1d28-Paper. 8 pages.

D. Mimno and A. Mccallum Topic models conditioned on arbitrary features with dirichlet-multinomial regression. In Proceedings of the Twenty-Fourth Conference on Uncertainty in Artificial Intelligence, UAI'08, p. 411-418, Arlington, Virginia, USA, 2008. AUAI Press. ISBN 0974903949. URL https://dl.acm.org/doi/10.5555/3023476.3023525. 8 pages.

D. Ramage, D. Hall, R. Nallapati, and C. D. Manning. Labeled lda: A supervised topic model for credit attribution in multi-labeled corpora. In Proceedings of the 2009 Conference on Empirical Methods in Natural Language Processing: vol. 1-vol. 1, EMNLP '09, p. 248-256, USA, 2009. Association for Computational Linguistics. ISBN 9781932432596. URL https://dl.acm.org/doi/10.5555/1699510.1699543. 9 pages.

M. E. Roberts, B. M. Stewart, and E. M. Airoldi. A model of text for experimentation in the social sciences. Journal of the American Statistical Association, 111(515):988-1003, 2016. doi: 10.1080/01621459.2016.1141684. URL https://doi.org/10.1080/01621459.2016.1141684. 16 pages.

M. Rosen-Zvi, T. Griffiths, M. Steyvers, and P. Smyth. The author-topic model for authors and documents. In Proceedings of the 20th Conference on Uncertainty in Artificial Intelligence, UAI '04, p. 487-494, Arlington, Virginia, USA, 2004. AUAI Press. ISBN 0974903906. URL https://dl.acm.org/doi/10.5555/1036843.1036902. 8 pages.

H. Zhao, L. Du, W. Buntine, and G. Liu. Metalda: A topic model that efficiently incorporates meta information. In 2017 IEEE International Conference on Data Mining (ICDM), pp. 635-644, 2017. doi: 10.1109/ICDM.2017.73. URL https://ieeexplore.ieee.org/abstract/document/8215536. 11 pages.

H. Zhao, L. Du, G. Liu, and W. Buntine. Leveraging meta information in short text aggregation. In Proceedings of the 57th Annual Meeting of the Association for Computational Linguistics, pp. 4042-4049, Florence, Italy, July 2019b. Association for Computational Linguistics. doi: 10.18653/v1/P19-1396. URL https://www.aclweb.org/anthology/P19-1396. 8 pages.

J. Zhu, A. Ahmed, and E. P. Xing. Medlda: Maximum margin supervised topic models. Journal of Machine Learning Research, 13(74):2237-2278, 2012. URL http://jmlr.org/papers/v13/zhu12a.html. 42 pages.

K. E. Ihou, N. Bouguila, and W. Bouachir. Efficient integration of generative topic models into discriminative classifiers using robust probabilistic kernels. Pattern Analysis and Applications, 24(1):217-241, Feb. 2021. doi: 10.1007/s10044-020-00917-1. URL https://doi.org/10.1007/s10044-020-00917-1. 25 pages.

H. Zhao, L. Du, W. Buntine, and G. Liu. Leveraging external information in topic modelling. Knowledge and Information Systems, 61 (2):661-693, 2019a. doi: 10.1007/s10115-018-1213-y. URL https://doi.org/10.1007/s10115-018-1213-y. 33 pages.

(56) References Cited

OTHER PUBLICATIONS

George E. P. Box. Science and statistics. Journal of the American Statistical Association, 71(356): 791-799, 1976. doi: 10.1080/01621459.1976.10480949. URLhttps://www.tandfonline.com/doi/abs/10.1080/01621459. 1976.10480949. 10 pages.

W. R. Gilks. Derivative-free adaptive rejection sampling for gibbs sampling. In J. Bernardo, J. Berger, A. P. Dawid, and A. F. M. Smith, editors, Bayesian Statistics 4: proceedings of the Fourth Valencia International Meeting, Apr. 15-20, 1991, Oxford, UK, 1992. Clarendon Press. ISBN 978-0198522669. 9 pages.

W. R. Gilks and P. Wild. Adaptive rejection sampling for gibbs sampling. Journal of the Royal Statistical Society. Series C (Applied Statistics), 41(2):337-348, 1992. ISSN 00359254, 14679876. URLhttp://www.jstor.org/stable/2347565. 12 pages.

W. R. Gilks, N. G. Best, and K. K. C. Tan. Adaptive rejection metropolis sampling within gibbs sampling. Journal of the Royal Statistical Society: Series C (Applied Statistics), 44(4):455-472, 1995. doi: 10.2307/2986138. URL https://rss.onlinelibrary.wiley.com/doi/abs/10.2307/2986138. 18 pages.

Frederick Mosteller and David L. Wallace. Inference in an Authorship Problem. Journal of the American Statistical Association, vol. 58, No. 302 (Jun. 1963), pp. 275-309 (35 pages) Published By: Taylor & Francis, Ltd.

Anonymous. Intuition. From "Probability—Why does "explaining away" make intuitive sense?" Cross Validated. Apr. 5, 2013. URL: https://stats.stackexchange.com/questions/54849/why-does-explaining-away-make-intuitive-sense/54862#54862, retrieved Sep. 22, 2022. 2 pages.

M. Mccourt. Why Bayesian? Part I. Unpublished, retrieved Sep. 16, 2022, 13 pages.

Andrew Gelman, John B. Carlin, Hal S. Stern, David B. Dunson, Aki Vehtari, and Donald B. Rubin. Bayesian Data Analysis Third Edition, Chapter 5, Section 5.5, pp. 119-124. Chapman and Hall, New York, 2013. 7 p. .

\* cited by examiner

US 12,230,253 B2

AUTOMATIC CLASSIFICATION OF PHONE CALLS USING REPRESENTATION LEARNING BASED ON THE HIERARCHICAL PITMAN-YOR PROCESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2021 Invoca, Inc.

TECHNICAL FIELD

One technical field of the disclosure is computer-implemented artificial intelligence, in the sub field of natural language processing, using models that are programmed to automatically categorize natural language data such as transcripts of voice calls communicated between a calling person and a called entity. Another technical field is improvements to Bayesian Belief Network models and model generation techniques. Another technical field is semi-supervised machine learning model development, training, and deployment.

BACKGROUND

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Automatic classification of written and verbal communications can be extremely useful for grouping a large number of communications for review, analysis, or intervention. While there are many known techniques for classification of written communications, such techniques typically require either design by an expert, or a large amount of labelled training data. In either case, such models can be prohibitively expensive to curate. Moreover, many classification techniques in common use cannot readily be interpreted, and therefore may not be suitable in circumstances where auditing for fairness or correctness must be provided.

Classification methods for natural language documents include manually tuned heuristic methods such as keyword spotting and statistical or machine learning methods which are fit to labeled training data. Keyword-based methods are transparent and straightforward to audit. However, these models tend to have more limited capability. For example, it is difficult to support polysemy in keyword-based models. Since the word "appointment" could refer to scheduling an appointment, re-scheduling an appointment, or cancelling an appointment, this keyword alone is not useful for identifying appointments. Such limitations complicate the use of heuristic models; in order to achieve good accuracy, they must typically be programmed by an expert.

Traditional machine learning models apply statistical techniques to correlate classification categories with aspects of the data. Such techniques require inputs which are mathematically convenient to process, and they may not be able to directly handle natural language. These techniques thus require feature engineering, or the selection of aspects of the data by trained experts.

More recently, new techniques in representation learning have enabled computers to automatically discover useful features from raw data. Representation learning replaces manual feature engineering, and it allows traditional statistical classification techniques to be applied to raw data, without the intervention of human experts. Many recent developments in representation learning have involved deep learning, in which the feature model takes a hierarchical form. In such a hierarchical model, each successive layer transforms its input into a more general, more abstract form. Such connections can be chained together to connect raw input text to abstract labels such as "appointment set," "customer support issue," or "policy cancellation."

Deep learning most commonly refers to a model based on artificial neural networks, in which layers of the model are composed of interconnected nodes. The nodes in an artificial neural network may take a relatively simple form consisting of an affine transformation followed by a linear or non-linear scaling. Complexity in the network comes from the connections among the various nodes. Artificial neural networks can approximate any function, and thus can be used to create very expressive and powerful models.

However, there are a few disadvantages to using artificial neural networks as the basis for natural language processing models. Because artificial neural networks can approximate any function, they typically do not exhibit as strong of an inductive bias as most traditional machine learning models. Consequently, when working with highly expressive data such as natural language, artificial neural networks typically require much more training data. Large datasets can be both expensive and time consuming to collect.

Moreover, since artificial neural networks are typically trained using optimization or maximum likelihood estimation, they may not necessarily provide realistic estimates of their uncertainty. Consequently, these models may be prone to over-fitting, which complicates automatic training of the model. Realistic estimates of uncertainty are also helpful for feedback-based training procedures such as active learning.

Artificial neural networks are typically also difficult to interpret or understand in detail. In practice, they may be "black box" models which make predictions, but which provide no explanation of their predictions. This may make it difficult to audit neural network models, and may preclude their use when standards of ethics, fairness, or correctness must be guaranteed.

Thus, there is a need for improved artificial intelligence models for classifying phone conversations. If a highly predictive, highly interpretable model, which did not require large amounts of labelled training data, and which accurately quantified its own uncertainty could be developed, it would represent a significant advance in the state of the art.

BRIEF DESCRIPTION OF THE DRAWINGS

In the drawings:

FIG. 4E illustrates, in an embodiment, the relation between probability distributions p and parent distributions in the Pitman-Yor-Process (PYP) with some associated concentration b and discount a.

DETAILED DESCRIPTION

Figure 1:
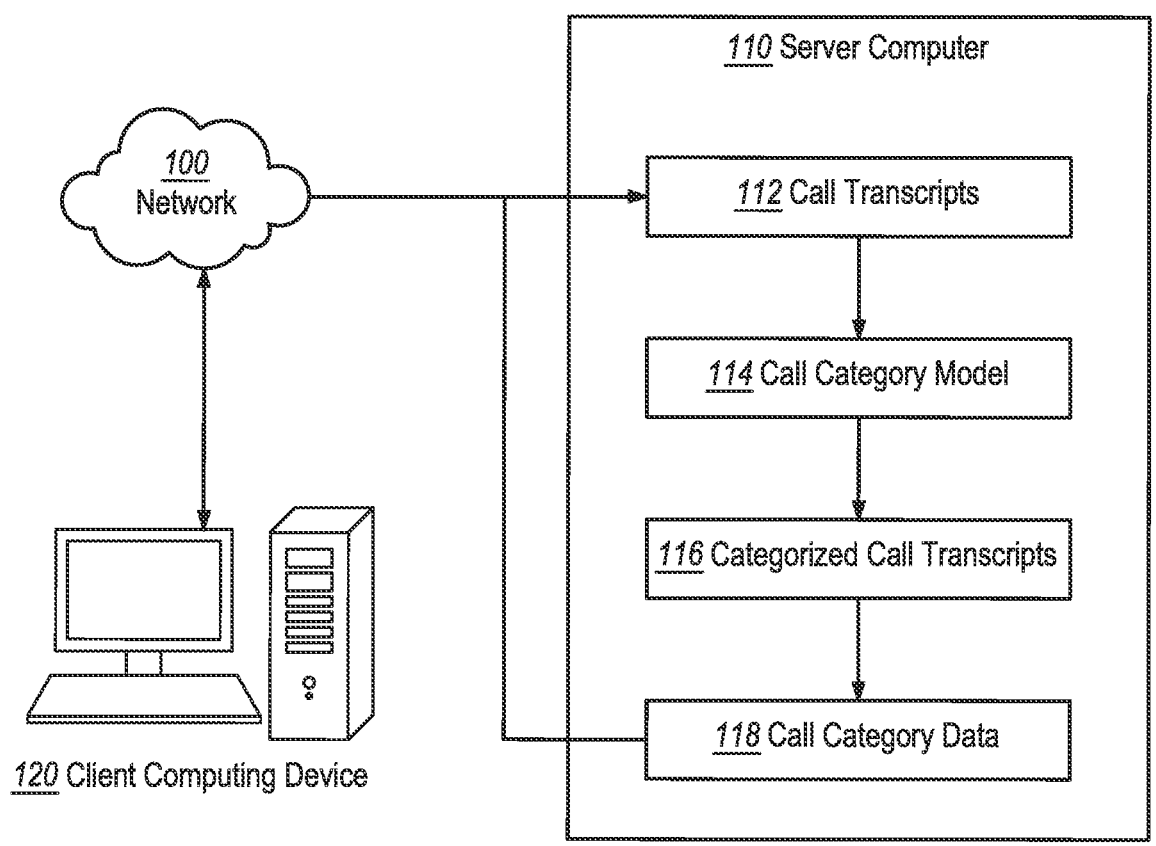
FIG. 1 depicts an example system for performing topic modeling on call transcripts.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1.0 GENERAL OVERVIEW
2.0 STRUCTURAL OVERVIEW
3.0 FUNCTIONAL OVERVIEW
4.0 THE CLASSIFIER MODEL
4.1 THE FEATURE MODEL
4.2 SAMPLING ALGORITHM FOR THE CONJOINED MODEL
   4.2.1 SAMPLING ALGORITHM FOR THE CLASSIFIER
   4.2.2 SAMPLING ALGORITHM FOR THE FEATURE MODEL
      4.2.2.1 SAMPLING VARIABLES INTERNAL TO THE TOPIC BRANCH
      4.2.2.2 SAMPLING ALGORITHM FOR VARIABLES INTERNAL TO THE WORD BRANCH
5.0 TOPIC DISPLAY
6.0 IMPLEMENTATION EXAMPLE—HARDWARE OVERVIEW 1.0 General Overview Embodiments of the disclosed technology include a representation learning model for classification of natural language text. In embodiments, a classification model comprises a feature model and a classifier. The feature model may be manually coded or may be considered a form of representational learning if it is learned automatically from data. As in deep learning models, the feature model of particular embodiments may be hierarchical in nature: data may pass through a series of representations, decreasing in specificity and increasing in generality. Intermediate levels of representation may then be used as automatically learned features to train a statistical classifier. The level of representation may not be restricted by the model and may be changed to suit any given task.

Unlike deep learning models, however, the feature model of particular embodiments is not based on neural networks. Instead, the feature model may be based on a hierarchical Pitman-Yor process. Natural language naturally tends to follow a statistical distribution known as Zipf's law. Zipf's law holds across a wide range of languages, in both spoken and written form. Since the Pitman-Yor process defines a probability distribution over Zipf-type distributions, it may provide a convenient mathematical basis for models of natural language.

While the Pitman-Yor process cannot be used to approximate any function like an artificial neural network might be able to do, it may be intrinsically well-suited to natural language. This property means that the Pitman-Yor-based models may exhibit very strong inductive bias compared to artificial neural networks. Rather than learning everything from the data, Pitman-Yor-based models possess intrinsic structure. The overall structure of the network need not be learned from the data; instead, only parameter values need to be learned. Because of this inductive bias, the Pitman-Yor-based models of particular embodiments may be trained using much less data than artificial neural networks typically require.

Moreover, because the Pitman-Yor process imposes strong constraints on the model, its parameters are inherently more predictable. In embodiments, since the structure of the network is known from the outset, elements of the model can thus be identified with vocabulary, topical themes, or dialectal variants. Quantities for these elements may then be learned from the data and can be inspected.

Another advantage of using the Pitman-Yor process in particular embodiments is that it is entirely statistical in nature. It may be advantageous to learn Zipf-type probability distributions to represent predictive aspects of language. The Pitman-Yor process defines a probability distribution over Zipf-type distributions. By using the Pitman-Yor process as a prior distribution, machine learning may be implemented using Bayes' theorem to obtain posterior distributions over each of a set of inferred quantities. In particular embodiments, the feature model may automatically quantify the uncertainty in each of its parameters and predictions and is therefore not prone to over-fitting. This property facilitates automatic training of the feature model. This property also enables the feature model to be used in feedback-based training loops such as active learning.

Since the Pitman-Yor process defines a fully statistical relationship between elements of the model disclosed herein, the feature model may be expressed as a Bayesian Belief Network. Thus, variations in the data such as variations by season, region, dialect, or advertising campaign may be accounted for by imposing a hierarchical structure on the data in which subsequent layers may represent specializations of higher layers. Such modifications increase the inductive bias of the disclosed model, increasing both its interpretability and its ability to train effectively on small datasets.

Once the feature model has been expressed as a Bayesian Belief Network and one or more features of the feature model have been selected for prediction, the feature model may be attached to a classifier. Many types of classifiers can be used; the only requirement may be that the classifier define a probability distribution over labels when conditioned on input features $P(labels\ l | features\ f)$. Multiplying this distribution by the feature model $P(features\ f\ data\ d)$ generates a joint distribution over labels, features, and data $P(l|f)\ P(f,\ d) = P(l,\ f,\ d)$. The integrated model can then be trained using Bayes' theorem to obtain a model for labels and features conditioned on the data $P(l,\ f, | d) = P(l,\ f,\ d)/P(d)$. Integrating this distribution over features f then provides a probability One embodiment of the disclosed technology includes digitally storing first call transcript data that is associated with an observed label of a set of observed labels, the first call transcript data comprising an electronic digital representation of a verbal transcription of a call between a first person of a first person type and a second person of a second person type, the first call transcript data having been created based on speech-to-text recognition of an audio recording of the call, the first call transcript data being divided into first person type data comprising words spoken by the first person in the call and second person type data comprising words spoken by the second person type in the call; digitally generating and storing a machine learning statistical topic model in computer memory, the topic model comprising a word branch and a topic branch, and a classifier that defines a joint probability distribution over features and observed labels, the classifier being conjoined to the topic branch of the topic model, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics; programmatically training, using a set of call transcript data that includes the first call transcript data, the topic model using the classifier, the set of call transcript data comprising at least one call transcript data not associated with an observed label; receiving target call transcript data comprising an electronic digital representation of a verbal transcription of a target call; determining, using the topic model, at least one of one or more topics of the target call or a classification of the target call; and digitally storing the target call transcript data with additional data indicating at least one of the one or more topics of the target call or the classification of the target call.

In an embodiment, the word branch of the topic model models words as parts of phrases and the topic branch of the topic model models transition probabilities among topics.

In an embodiment, the topic model additionally models the call transcript data as a function of a plurality of topics which are modeled as a function of a probability distribution of topics.

In an embodiment, the probability distribution of topics is modeled as a function of an inferred prior probability distribution which is modeled as a function of a flat prior distribution.

In an embodiment, the probability distribution of topics is modeled as a function of the inferred prior probability distribution using a Pitman-Yor Process and the inferred prior probability distribution is modeled as a function of the flat prior distribution using a Pitman-Yor Process.

In an embodiment, the third probability distribution of words for each topic is modeled as a function of an inferred prior probability distribution which is modeled as a function of a flat prior distribution.

In an embodiment, the third probability distribution of words for each topic is modeled as a function of the inferred prior probability distribution using a Pitman-Yor Process and the inferred prior probability distribution is modeled as a function of the flat prior distribution using a Pitman-Yor Process.

An embodiment involves determining the one or more topics of the call using the topic model by inverting the Bayesian Belief Network using Bayes' theorem.

In an embodiment, the classifier is a linear classifier comprising one of a Finnish Horseshoe Model, an L2 Logistic Regression, or a Logistic Regression using the Horseshoe Potential.

In an embodiment, the classifier is a Finnish Horseshoe Model and all the parameters of the Finnish Horseshoe Model are inferred.

In an embodiment, training the topic model involves a Rao-Blackwellization process and using a Hamiltonian Monte Carlo algorithm to update the classifier.

In an embodiment, the first person type is a caller type and the second person type is an agent type.

An embodiment involves providing, to a client computing device, topic information indicating, for each of a plurality of topics, a number or percentage of calls received for that topic over a particular period of time.

2.0 Structural Overview

FIG. 1 depicts an example system for performing classification on call transcripts. FIG. 1, and the other drawing figures and all of the description and claims in this disclosure, are intended to present, disclose and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of automated, programmatic determination of topics in digitally stored natural language texts or transcripts. Every step or operation that is functionally described in the disclosure is intended for implementation using programmed instructions that are executed by computer. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a server computer 110 is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, client computing device 120, and other elements of the system may each comprise an interface compatible with the network 100 and are programmed or configured to use standardized protocols for communication across the networks such as TCP/IP, Bluetooth, and higher-layer protocols such as HTTP, TLS, and the like.

The client computing device 120 is a computer that includes hardware capable of communicatively coupling the device to one or more server computers, such as server computer 110, over one or more service providers. For example, client computing device 120 may include a network card that communicates with server computer 110 through a home or office wireless router (not illustrated in FIG. 1) coupled to an internet service provider. The client computing device 120 may be a smart phone, personal computer, tablet computing device, PDA, laptop, or any other computing device capable of transmitting and receiving information and performing the functions described herein.

The server computer 110 may be implemented using a server-class computer or other computer having one or more processor cores, co-processors, or other computers. The server computer 110 may be a physical server computer and/or virtual server instance stored in a data center, such as through cloud computing.

In an embodiment, server computer 110 receives call transcripts 112 over network 100 from client computing device 120. The call transcripts may comprise an electronic digital representation of a verbal transcription of calls between two or more parties. For example, a call transcript for a call dealership may comprise written dialogue between an agent and a customer that has been transcribed from an audio conversation between the agent and the customer. The call transcripts may include data labeling portions of the dialogue with identifiers of the parties and/or party types. For example, when used for conversations between a customer and a goods or services provider, the portions of the dialogue may be labeled based on whether the portions were spoken by the customer or by an agent of the goods or services provider.

In an embodiment, server computer 110 stores a classification model. The classification model comprises computer readable instructions which, when executed by one or more processors, cause the server computer 110 to compute one or more output outcomes or labels based on input call transcripts. The classification model may comprise a mathematical model that is trained at the server computer 110 or trained at an external computing device and provided to server computer 110.

Call transcripts may be evaluated by the server computer 110 by using the call transcripts as input into the classification model 114. Using the classification model, as described further herein, the server computer 110 may identify one or more abstract representations for the call transcripts, which are then used to predict outcomes or classification labels for the calls. The server computer may then store the call transcripts with data identifying the one or more representations, outcomes, and labels. In an embodiment, further data is stored relating to the one or more representations, outcomes, and labels. In some embodiments, the server computer removes the call transcripts from storage after its representations have been identified. The server computer may instead store the call representations and other summary information from the call transcripts.

In an embodiment, the server computer generates representation and category data 118 from a plurality of categorized call transcripts. The representation and category data 118 may comprise aggregated information from a plurality of categorized call transcripts. For example, the representation data may identify each of a plurality of thematic elements, average length of time spent on each theme per call, total amount of time spent on each theme, and/or other aggregated information regarding the call transcripts or modeled representations.

For purposes of illustrating a clear example, FIG. 1 shows a limited number of instances of certain functional elements. However, in other embodiments, there may be any number of such elements. For example, embodiments with multiple client computing devices may include a first client computing device or first plurality of client computing devices which sends the call transcripts to the server computer and a second client computing device or second plurality of client computing devices which receives the representation, outcome, and label data from the server computer. Further, the server computer 110 may be implemented using two or more processor cores, clusters, or instances of physical machines or virtual machines, configured in a discreet location or co-located with other elements in a datacenter, shared computing facility, or cloud computing facility.

3.0 Functional Overview

Figure 2:
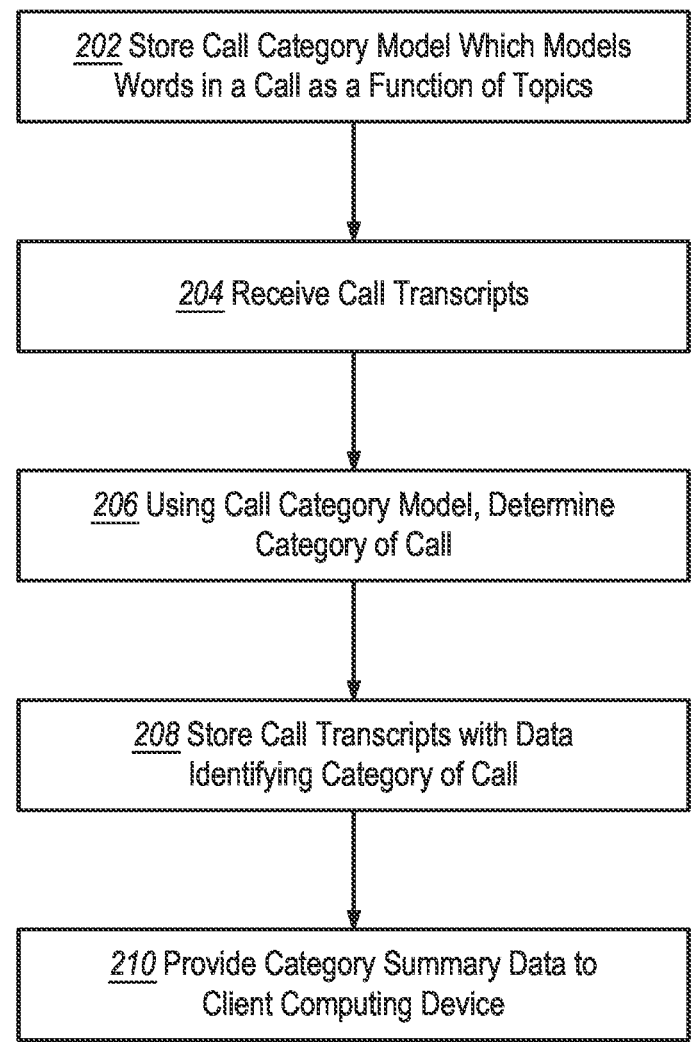
FIG. 2 depicts an example method of using a topic model to identify topics of audio dialogues based on call transcripts.

FIG. 2 depicts an example method of using a topic model to identify classification labels or outcomes of audio dialogues based on call transcripts.

At step 202, a classification model is stored which models words as a function of topics, abstract representations, or features produced by the feature model. For example, a topic feature model may model specific words spoken on a plurality of calls by identifying a latent set of one or more themes or topics which are shared across all calls. Examples of the classification and topic feature models are described further herein. The server computer may store a model trained for a particular customer using previously received transcripts. The training of the classification model may be performed at the server computer and/or at an external computing device. The model may be trained using labeled data or a mixture of labeled and unlabeled data in a semi-supervised mode. The model may be trained using a Rao-Blackwellization process, as described further herein, or by another process. In embodiments, discrete variables may be updated using a Gibs sampler or other method and continuous variables may be updated using a Hamiltonian Monte Carlo algorithm or other method.

At step 204, call transcripts for a call are received. The call transcripts may comprise electronic digital representations of verbal transcriptions of the call. For example, the call transcripts may include transcribed dialogue from a telephonic communication that have been created and stored using computer programs that execute speech-to-text recognition and conversion algorithms. The transcribed dialogue may uniquely identify the different parties to the conversation. In an embodiment, the different parties are identified as a person type, such as agent and customer. Tags may be placed in the transcriptions of the call which identify, for a block of dialogue, the party or party type which spoke the block of dialogue in the call. The call transcripts may additionally comprise metadata, such as timestamps for one or more blocks of text, total call length, or other call information. The call transcripts may be labeled or unlabeled. Labeled transcripts may have associated labels or annotation metadata ascribed to them from a source which may comprise a human annotator with domain-specific expertise. Receiving the call transcripts may comprise receiving the call transcripts from an external computing device and/or generating call transcripts from an audio file received from an external computing device and receiving the call transcripts from memory of the server computer. Receiving the call transcripts may also broadly comprise loading the call transcripts from any type of accessible digital memory. Receiving the call transcripts may also comprise receiving, or loading from any accessible digital memory, data which represents the call transcripts.

At step 206, the classification model is used to determine one or more outcomes or class labels for the call. For instance, the server computer may execute instructions to run the trained classification model using the call transcript as input to identify one or more outcomes or class labels for the call. In an embodiment, the call transcript is augmented by the server computer prior to execution of the classification model to transform the call transcript into data which can be read by the classification model. The transformations may include editing the call transcription to change its form so it can be read by the classification model, such as by removing pieces of metadata, changing the file structure of the call transcripts, or splitting the call transcript based on person type, as described further herein.

At step 208, the call transcripts are stored accompanying representation, label, and outcome data. One or more call transcripts and any corresponding topics, or data representing the call transcripts and any corresponding topics, may be stored in any type of digital memory, volatile or non-volatile, persistent or non-persistent.

At step 210, classification and feature data may be provided to a client computing device. For example, the server computer may cause display of a Graphical User Interface (GUI) on the client computing device which displays aggregated feature summary data. Example displays are described further herein. The server computer may additionally or alternatively provide call transcripts supplemented with determined feature, label, or outcome identifiers for each of a plurality of call transcripts In embodiments, this summary data, or one or more representations for one or more calls with any type of identifying data, may be caused to display in any GUI the server computer may communicate with.

Step 210 provides the practical result of transmitting, to a client computing device, feature, label, and outcome data that did not previously exist, and accurately based upon a text transcript of a prior oral audio conversation that was digitally captured and subject to speech-to-text recognition and processing. The process of FIG. 2 as a whole provides the practical application of extracting, by machine and without human intervention, the conceptual information that were addressed in such an oral, audio conversation, and otherwise would have been unavailable via an audio recording of the conversation and/or not apparent in a raw, speech-to-text transcript of the conversation. Consequently, the process and the techniques herein make it possible for analysts to access thematic and outcome data that otherwise would have to be tediously determined by replaying call transcripts and using manual mental analysis to think about what is being discussed. When the input dataset consists of thousands to millions of call transcripts, for example from thousands to millions of voice calls to customer service representatives or other units of an enterprise, the scale of the problem makes human review impossible and error-prone. The present techniques achieve the solution of accurate, data-based determination of outcomes of call transcripts on a scalable basis.

The present techniques provide a practical application of computing technology in part by digitally storing first call transcript data that is associated with an observed label of a set of observed labels, the first call transcript data comprising an electronic digital representation of a verbal transcription of a call between a first person of a first person type and a second person of a second person type, the first call transcript data having been created based on speech-to-text recognition of an audio recording of the call, the first call transcript data being divided into first person type data comprising words spoken by the first person in the call and second person type data comprising words spoken by the second person in the call. In this manner, the techniques can interoperate with tangibly stored technical elements such as audio recordings and digital transcripts. The techniques also provide such a practical application in part by digitally generating and storing a machine learning statistical topic model in computer memory, the topic model comprising a word branch, a topic branch, and a classifier that defines a joint probability distribution over topic vectors and observed labels, the classifier being conjoined to the topic branch, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics; programmatically training, using a set of call transcript data that includes the first call transcript data, the topic model using the classifier, the set of call transcript data comprising at least one call transcript data not associated with an observed label; receiving target call transcript data comprising an electronic digital representation of a verbal transcription of a target call; programmatically determining, using the topic model, at least one of one or more topics of the target call or a classification of the target call; and digitally storing the target call transcript data with additional data indicating at least one of the one or more topics of the target call or the classification of the target call. In this manner, computer memory is modified to create and store a workable machine learning model that can operate on the transcripts to generate topic data that did not previously exist, thus providing a new digital output having practical utility for the user.

4.0 The Classifier Model

Figure 3:
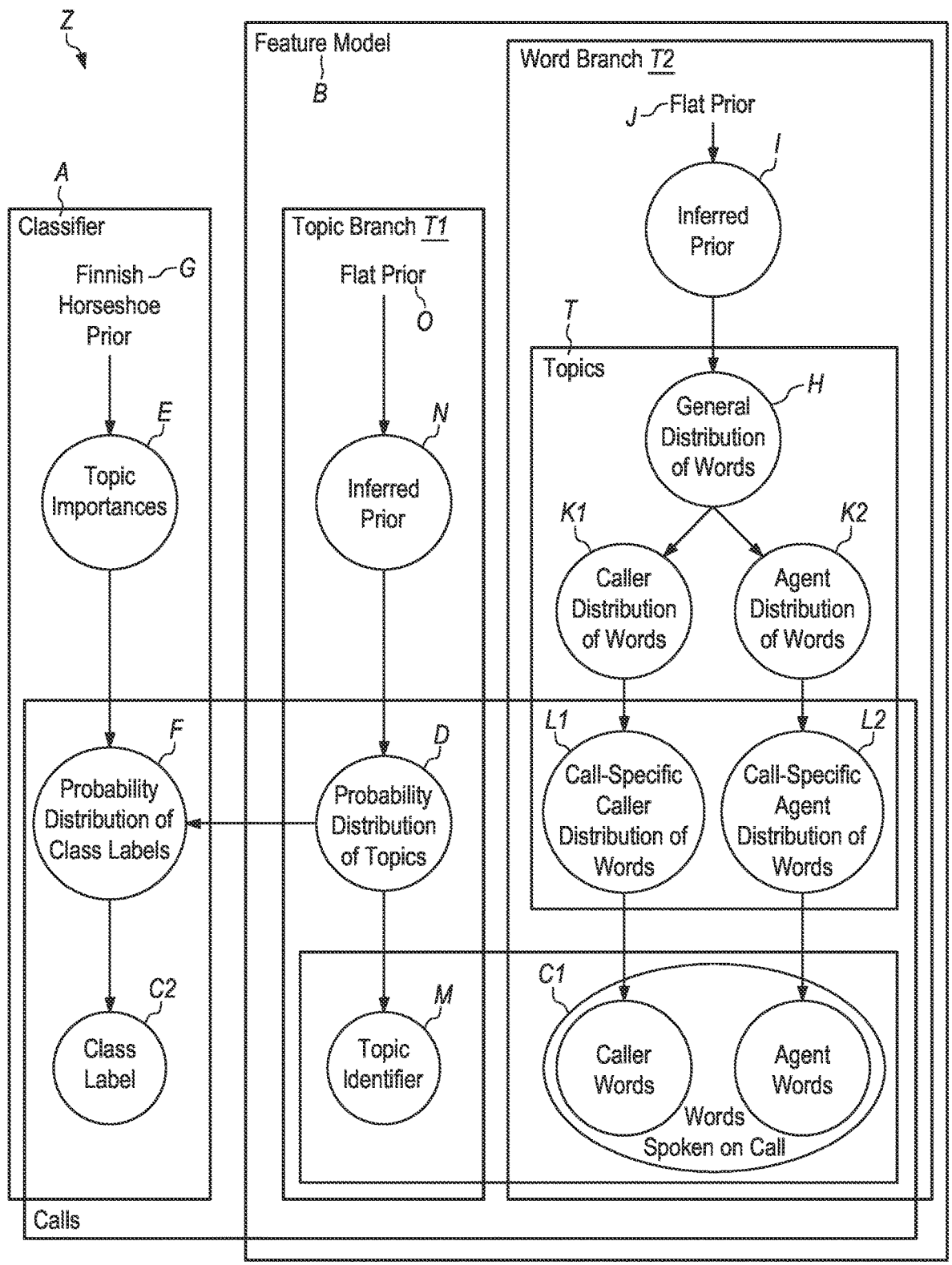
FIG. 3 depicts an example classifier model comprising a classifier and a feature model comprising a word branch and a topic branch, the feature model segregating parties of conversations, in an embodiment.

FIG. 3 depicts an example classifier model Z comprising a classifier A and a feature model B, the feature model B comprising a word branch T2 and a topic branch T1. In the depicted embodiment, the feature model B segregates parties to conversations as is explained with more specificity herein. The classifier A is conjoined with the feature model B. The conjoined models define a joint probability distribution over features internal to the models and the data. Data takes the form of words spoken on the call C1 and class labels C2 (or categories) supplied for each call of a set of calls S. If any data C1 or C2 is missing, it may be imputed or marginalized using probability distributions inferred by the model.

In the example shown in FIG. 3, the classifier A takes the form of a linear model. This model takes, as input, features (depicted in FIG. 3 as Probability Distribution of Topics D) generated by the feature model B and infers importances E for each feature for each possible outcome. The linear model assumes the logarithm of the odds ratio for each outcome is a linear function of the features (D) and topic importances E. The probability distribution of class labels F can be inferred from this log odds ratio via simple arithmetic. While this example shows a linear model, non-linear models such as certain feed-forward neural networks are equally applicable to the method.

In embodiments, a non-linear classifier may be used instead of a linear classifier. A non-linear classifier may permit modeling of an exclusive OR, e.g. identifying that a call is of a particular class when either a set of words X (many of which are in topic x) or a set of words Y (many of which are in topic y) are discussed on a call, but not when both are discussed on a call. One such non-linear classifier that could be used is a simple feed-forward neural network, but many others are possible.

In the example embodiment of FIG. 3, the classifier A uses a Finnish Horseshoe prior G for the topic importances E (such a classifier A may be referred to as a Finish Horseshoe Model), but any classifier A may be used which defines a joint probability distribution F over call features (D) and observed labels C2. Other exemplary linear classifiers include the L2 Logistic Regression, and the Logistic Regression using the Horseshoe Potential, but many others are possible.

Some embodiments may use the Finnish Horseshoe prior G to enhance the predictive power of the model and achieve a higher level of model interpretability. Using the Finnish Horseshoe prior G in conjunction with a linear classifier and a feature model B expresses the prior belief that certain features may, or may not, matter to predictions. As opposed to a common machine learning model that implicitly assumes a normal distribution for parameters, this setup explicitly allows for the possibilities of two classes of features, only one of which is important. For example, the weather could be a semi-common topic of small talk on sales calls, the weather topic being associated with words like sunny, rain, lightening, etc. But the existence of words indicating the weather topic on a call might be a poor indicator of whether the call is about scheduling an appointment or is any other particular type of call. The Finnish Horseshoe prior G can account for this.

The graph of FIG. 3 defines an equation which is a joint probability distribution over all of the modeled parameters and all of the data used to train the model. The training data comprises digital representations of spoken words C1, and associated labels C2. As can be seen by the apparent lack of any connection between the words C1 and the classifier branch A of the feature model Z, the graph expresses conditional independence: If the call features (represented here as the Probability Distribution of Topics D) were known, then nothing in the classifier branch A would depend on the spoken words C1. The classifier A instead operates on high-level themes present in the calls S. But because the features (D) are not known, a solution involves conditioning on the data to obtain a posterior distribution over the parameters given the data (C1 and C2). Such conditioning induces dependencies between prediction probabilities F and spoken words C1 due to a statistical phenomenon known as "explaining away." The classifier model Z can thus be trained using word data from call transcripts.

Because the graph of FIG. 3 defines a joint probability distribution over all of the model parameters and all of the data, if any data C1 or C2 is missing it may be marginalized by integrating the missing variables out from this joint distribution. This property allows the model Z defined in FIG. 3 to be trained on incomplete data, in semi-supervised fashion. This property is especially useful because word data C1 is available at low cost and in abundance, while label or category information C2 is expensive and labor-intensive to obtain.

Training a call classification model Z in a semi-supervised fashion, as described herein, allows for the creation of a model that may be much more predictive than models which cannot be trained in semi-supervised fashion. Effectively, unlabeled call data C1 (which is potentially cheap and abundant) can be used to identify thematic elements in the data pertinent to the feature model B, while labeled calls C2 can be used to infer which of those patterns are predictive of desired outcomes. This allows a model Z implemented according to the disclosed technology to potentially train on much smaller datasets than state of the art models, creating an opportunity to use the disclosed technology in diverse settings with reduced expenditure of effort and resources.

4.1 The Feature Model

As noted above, the classifier A discussed in section 4.1 does not operate directly in the transcript data C1. Instead, the classifier A operates on high-level features inferred by the feature model B of FIG. 3. As described herein, the disclosed feature model B generally takes the form of a Bayesian Belief Network based on the hierarchical Pitman-Yor process. In the specific example of FIG. 3, this Bayesian Belief Network takes the form of an admixture model, otherwise known as a topic model. In this admixture model, topics T represent recurring thematic elements in the dataset. Topics T can be represented as mixtures of words or probability distributions over words H. In the admixture model, calls may be represented as mixtures of topics T. Calls can thus be represented as probability distributions over topics D. In the particular depicted embodiment, probability distribution over topics D also defines the features passed to the classifier A, indirectly linking call categories C2 to the spoken words C1. In embodiments where feature model B is a general Bayesian Belief Network, but not an admixture model or topic model, a more general set of features may be passed to the classifier A, indirectly linking call Categories C2 to the spoken words C1.

The models described herein comprise mathematical models described at a level that a person of skill in the art would be able to make and use the model without undue experimentation. Generally, the topics comprise probabilistic models for each of the words spoken on every call. These probabilities may be modeled as functions of the topics relevant to the application, the vocabulary associated with each topic, and of how prevalent each topic is.

FIG. 3 depicts an example of a feature model B [which may be thought of as a topic model] comprising a word branch T2 and a topic branch T1, the topic model segregating parties of the conversation, in an embodiment. Such a model may distinguish, for example, how customers speak and how agents speak, unlike basic topic models which may treat all words as coming from the same source.

Notably, the topic branch T1 of the topic model and the word branch T2 of the topic model may be assumed to be conditionally independent. As is described further herein, this assumed conditional independence may be used to create a blocked sampler for topic assignments which allows all of the different model components to be updated at once. The internal details of each component may be updated using, for example, a Gibbs sampler, wherein each component is updated in sequence, conditioned on all the others.

In an embodiment, the feature model B of FIG. 3 comprises a word branch T2 where topics T modeled as a General Distribution of Words H for words in a call are modeled as being drawn from an inferred prior distribution I, which is unknown before training the model. This inferred prior distribution I indicates a lexicon, or an overall probability distribution for words in the dataset as a whole. In an embodiment, the lexicon indicated by prior distribution I may be inferred by the feature model B from an assumed uniform distribution J. Notably, however, said detail is not essential to the model Z; for example, replacing the uniform distribution J with an empirical distribution derived from the training data is also applicable. Many other possibilities are equally applicable.

The topics T modeled by H may represent high-level, recurring thematic structure in the data. However, the data also contains recurring structures which are not thematic in nature and therefore are not relevant for the purposes of call categorization. For example, when a caller makes an appointment with an agent at a medical clinic, the caller and agent may use different words. An ordinary topic model might learn separate "appointment" topics for the caller- and agent-sides of the conversation. Not only is this topic fragmentation computationally wasteful, but since both topics must be found to identify "appointment" conversations, it is potentially confusing for the user. Similar topic fragmentation could be caused by seasonal variation in speech, different or new marketing campaigns, etc. An even more severe fragmentation can occur because callers with different accents or dialects may use different words to express the same idea. An ordinary topic model might learn different topics for different dialects. This opens the possibility for a classifier to learn to predict based on dialect, implicitly biasing predictions against speakers with different accents or dialects. On the other hand, feature model B [the topic model of embodiments] may be restricted to predict based on the high-level thematic information. In an embodiment, this may prevent the model from implicitly biasing against speakers with certain dialects, improving the interpretability and the auditability of the model; and, since data relevant to each thematic topic may be preserved within that topic instead of being fragmented across many others, model Z may be trained using less data than other types of models.

In an embodiment, such restriction may be implemented by explicitly modeling certain types of variability in the topics T. This allowance may prevent the model from implicitly modeling variability by spawning duplicate topics. In the embodiment of FIG. 3, feature model B explicitly model's caller- and agent-variants of each topic as K1 and K2 respectively, each independently derived from the high-level topics modeled by H. This handling prevents differences between the caller and agent sides of the conversation from influencing the high-level topics modeled by H.

In order to prevent caller dialects or idiomatic speech from influencing model predictions, the example embodiment of FIG. 3 comprises an additional level comprising L1 and L2 in the topic branch T2 of the feature model B. L1 and L2 may model special variants of the caller- and agent-topics K1 and K2, respectively, derived for each individual caller and agent. Thus, each unique speaker may be modeled as obtaining his or her own personal variant of each topic. His or her words are then modeled as being chosen from this personalized topic. Explicitly modeling such dependence may prevent idiomatic speech from influencing the high-level topics modeled by H.

Due to this hierarchical dependence, the topic model of embodiments (depicted as Feature Model B in FIG. 3) is not a simple admixture model. Instead, the topic model may represent a mixture of mixtures of mixtures of mixtures. This hierarchical dependence summarizes the datasets at various levels of detail, from the individual (L1 and L2), to the speaking party (K1 and K2), to the thematic (H), to the corpus as a whole (I). The model B thus provides a range of levels of insight into the dataset. In the particular example illustrated in FIG. 3, high-level thematic features modeled as the probability distribution over words H may be used as feature inputs for the classifier A. However, other possibilities are also possible, and may be chosen to suit the needs at hand.

Thus far, a hierarchical model for the probability distributions L1 and L2 of words C1 has been described. This model presumes that each word is associated with one of a multiplicity of topics, or themes. Thus, feature model B must also determine to which theme each word is associated. FIG. 3 indicates modeling this determination using the topic identifier M. The topic identifier M is a tag associated with each spoken word, indicating which of the abstract themes H that word is associated with. In an embodiment, the topic identifier M is assumed to be drawn from a per-call probability distribution D over topics, which is modeled hierarchically. The multiplicity of distributions D may each be assumed to be drawn from an unknown prior distribution N, which is inferred by the model. In an embodiment, the prior distribution N represents the corpus-wide prevalence of each of the topics T modeled by H, and is assumed to be drawn from a uniform prior over topics O. But this detail is not essential to the model; replacing the uniform distribution O with, e.g., a power-law or other distribution may be equally valid.

The high-level topics H may represent recurring themes present in the dataset. In an embodiment, the distribution N indicates, on a corpus level, how prevalent each of these themes are. The distributions H and N may therefore represent a corpus-level summary of the data. The per-call distributions D may specialize this information to each individual call. In effect, D may provide a high-level, abstract summary for each call. In an embodiment, this is the information passed to the classifier A of FIG. 3. In an embodiment, because the feature model B and classifier A are trained concurrently, the feature model B learns to obtain features (D) which not only summarize each call of the set S, but which are also highly predictive of call categories. In this way, the feature model B may be directed by the classifier A.

In an embodiment, a hierarchical feature model B thus entails deriving progressively more specialized probability distributions from more general distributions. In embodiments, the process of modeling distributions over probability distributions may be accomplished with the Pitman-Yor Process. Although embodiments may model this process in another way, such as by using a Dirichlet distribution, Dirichlet process, or other nonparametric prior process, the Pitman-Yor process may be more flexible and better suited to language than the Dirichlet distribution, which may be used for an ordinary topic model such as the Latent Dirichlet allocation (LDA) model. For instance, the Pitman-Yor process can model power-law distributions which better match distributions of words in language, thus providing more accurate and more efficient models.

In the discussion of FIG. 3 thus far, it has been assumed that each distribution applies to individual words; this assumption is often called the "bag of words" approximation in natural language processing. But this assumption is not required by feature model B; the description of section 4.0 and 4.1 of this disclosure may apply equally to distributions over pairs, triplets, or higher-order combinations of words, without modification.

In effect, the word branch T2 of feature model B could also model phrases instead of words. And the topic branch T1 of feature model B could also model transition probabilities among topics in addition to their marginal probabilities. Such embodiments might increase the dimensionality of the data, and thus the computational power needed to process it, but would not require a different underlying methodology.

In an embodiment, extra layers of hierarchy could be introduced in the model to handle sequences of words, for example, a probability distribution over three-word phrases $P(w1, w2, w3)=P(w1) P(w2|w1) P(w3|w1, w2)$. In such an embodiment, each of the three terms is a single probability distribution over words and thus has the same mathematical form as any object on the word branch T2 of the feature model B. The conditional dependencies may then represent the same mathematical relationship as between adjacent layers of the graph in FIG. 3. Thus, straightforward modifications to the Bayesian Belief Network in FIG. 3, without any changes to the underlying methodology, can accommodate a wide range of aspects of the data, as needed.

4.2 Sampling Algorithm for the Conjoined Model

In an embodiment, the combined classifier model Z shown in FIG. 3 represents a joint probability distribution $P(v_A, v_B | \mathcal{D})$ over the components $v_A$ internal to the classifier A, the components $v_B$ internal to the feature model B, and the data $\mathcal{D}$. Given an observed dataset Data, we want to obtain the posterior probability distribution $P(v_A, v_B | \mathcal{D})$ over parameters internal to the model. If the components $v_A$ internal to the classifier A can be written as a conjunction of call labels $\ell$ and remaining components $\tilde{v}_A$, then in order to make predictions, we want the marginal distribution over labels $$P(\ell | \mathcal{D}) = \int_{\tilde{v}_A} \int_{v_B} P(v_A, v_B \mathcal{D}).$$

While these posterior probability distributions are difficult to obtain exactly for the model shown in FIG. 3, they may be obtained approximately by using Markov Chain Monte Carlo (MCMC). This section details an MCMC algorithm suitable for the model shown in FIG. 3.

According to the Metropolis-Hastings theorem, we can approximate samples from the joint distribution $P(v_A, v_B | \mathcal{D})$ by alternately sampling from the conditional distributions $P(v_A | v_B, \mathcal{D})$ and $P(v_B | v_A, \mathcal{D})$. This process is known as a Gibbs sampler, and represents what may be considered the highest-level step in a sampling algorithm of embodiments. The entire process of updating the model, as described, can be considered a form of Rao-Blackwellization. The following section 4.2.1 of this disclosure details an example algorithm for each of these conditional distributions.

4.2.1 Sampling Algorithm for the Classifier

As shown in FIG. 3, the classifier A may be independent of most of the data and all other aspects of the feature model if conditioned on the call features (modeled as D, in an embodiment). In an embodiment, sampling from the conditional distribution $P(v_A | v_B, \mathcal{D})$ therefore reduces to sampling from $P(v_A | D, C2)$, and classifier A may be trained as would an ordinary classifier.

An embodiment may use a Hamiltonian Monte Carlo sampler for this purpose because of its efficiency, its short correlation length, and its ability to perform in high-dimensional spaces. But any other MCMC technique may be equally applicable.

4.2.2 Sampling Algorithm for the Feature Model

As shown in FIG. 3, the feature model B may consist of two conditionally-independent branches: the word branch T2, beginning at J and culminating at C1, and the topic branch T1, beginning at O and culminating at M. The conditional probability $P(v_A, v_B | \mathcal{D})$ therefore factors into two terms, one representing each branch: $P(v_A, v_B | \mathcal{D}) = P(v_J | \mathcal{D}) \times P(v_O | v_A, \mathcal{D})$ where $v_J$ and $v_O$ represent variables internal to the word branch T2 and topic branch T1, respectively.

4.2.2.1 Sampling Variables Internal to the Topic Branch

Due to the conditional independence implied by the graph in FIG. 3, the conditional distribution $P(v_A, v_B | \mathcal{D})$ simplifies to P(N, D, M, F|O, E, C2) which factors into P(N, D, M|O)×P(F|D, E, C2).

Given that the distributions N and D are unknown, the distributions are described in terms of customer counts c, representing tallies of data within the distribution, which are partitioned into a set of latent counts called table counts t which represent the fraction of the customer counts which get passed up the hierarchy to inform the parent distribution, i.e. the number of customer counts that show up in the parent node or $c_k^{P(N)} = \Sigma_d t_{d,k}^N$ were N is a node, $\mathcal{P}(N)$ is the node's parent, k is the dimension of the node, the sum is over all draws in the node. Using customer and table counts, the probability of a topic may be computed as:

$$P(c^D, t^D, c^N, t^N, M | 0)$$

$$= \left[ \prod_J \left[ \frac{(b^D | a^D)_{T_j^D}}{(b^D)_{C_j^D}} \prod_K \frac{S_{D,k}^{c_{j,k}^D}}{H_{t_{j,k}^D}^{c_{j,k}^D}} \right] \right] \left[ \frac{(b^N | a^N)_{T^N}}{(b^N)_{C^N}} \prod_K \frac{S_{t_k^N}^{c_k^N}}{H_{t_k^N}^{c_k^N}} \right] \left[ \prod_K O_k^{c_k^O} \right]$$

where the distribution of topics has dimension K and spans over J draws. The term S is an unsigned Stirling number of the first kind. The terms a and b are parameters of the Pitman-Yor process known as the discount and concentration, respectively. They may be considered fixed values or sampled from this equation using any known sampling technique. The function H is the choose function, also known as the binomial coefficient. The terms C and T are summations of the customer and table counts, respectively. Thus, $C \equiv \Sigma_k c_k$ and $T \equiv \Sigma_k t_k$. The terms $(b|a)_T$ and $(b)_c$ are Pochhammer symbols that have the identity of:

$$(b|a)_T = b(b+a)(b+2a) \ldots (b+(T-1)a)$$

$$(b)_c = b(b+1)(b+2) \ldots (b+C-1).$$

As the customer counts in the above equation are deterministic tallies of data internal to the model, the server computer may compute the probability above by sampling the table counts using a Gibbs sampler. Additionally or alternatively, a table indicator (u) may be defined as a Boolean variable indicating whether or not a data point created a new table count: $t_k = \Sigma_{n=1}^{c_k} u_{n,k}$. The server computer may sample the table indicators instead of the table counts to reduce the computational cost of sampling table counts. For each word in the dataset, the server computer may compute a probability for each topic assignment and all of the attendant table indicators u. Summing this equation over all possible values u then yields the conditional distribution P(N, D, M|O).

Figure 4A:
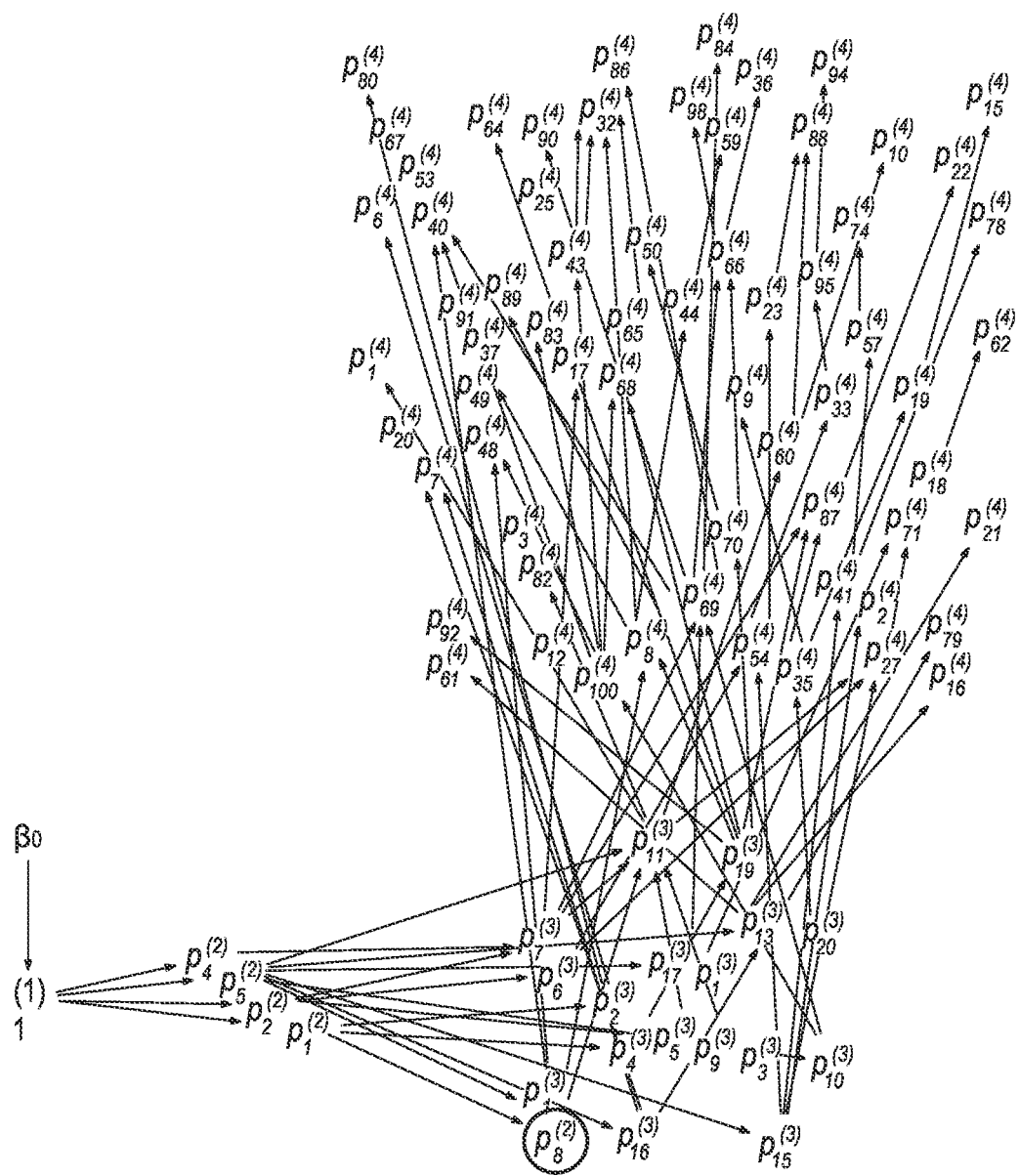
FIG. 4A illustrates a visualization of a plurality of probability distributions chained together by a hierarchical Pitman-Yor-Process (PYP).

FIG. 4A illustrates a visualization of a plurality of probability distributions chained together by a hierarchical Pitman-Yor process. As explained herein, customer counts at any given node represent the sum of the table counts over all of its children. Since model Z may support an arbitrary Bayesian Belief Network, such a sum can become computationally impractical.

This child summing problem may be solved by imposing a strict hierarchy on the probability distributions. Thus, related sets of distributions may be grouped together into related sets of distributions called nodes. Probabilities within a node can be termed draws. In an embodiment, grouping distributions together into nodes facilitates finding all of the children for any distribution. When summing over child distributions, three distinct cases are possible: one-to-one, one-to-all, and arbitrary.

Figure 4B:
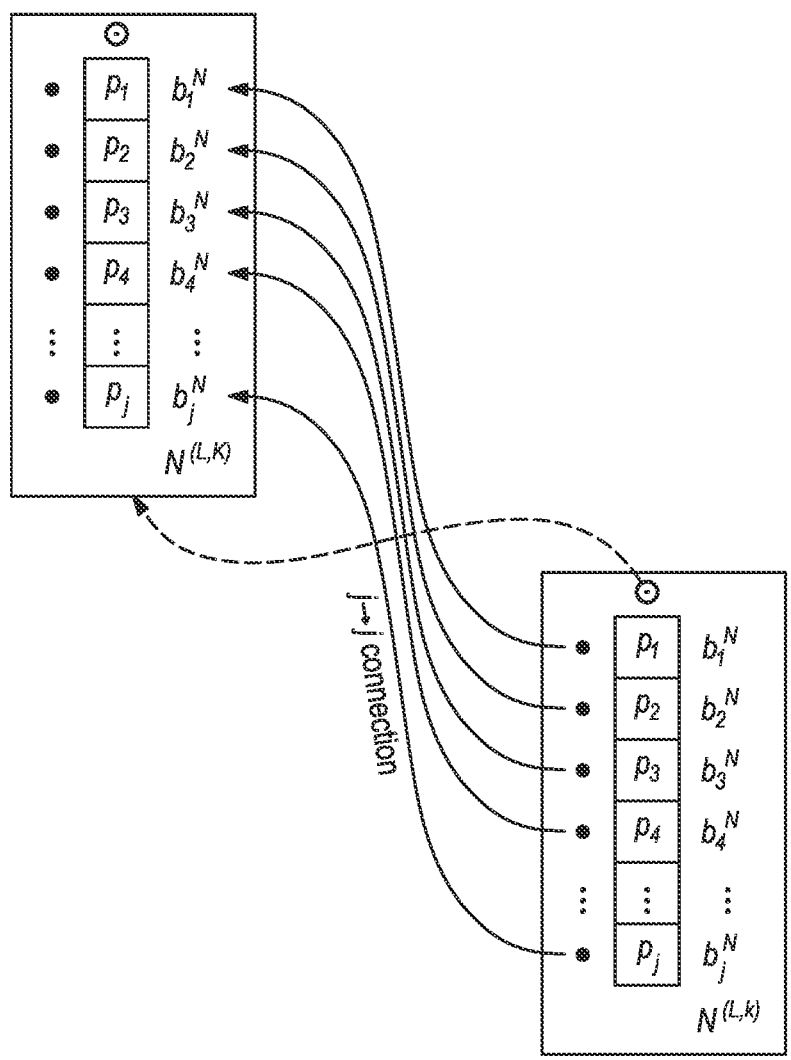
FIG. 4B illustrates a j to j connection node relationship in a PYP, in which both nodes have the same size and each draw's parent is in a corresponding position in the parent node.

FIG. 4B illustrates a j to j connection node relationship, in which both nodes have the same size and each draw's parent is in a corresponding position in the parent node. This is the one-to-one case.

Figure 4C:
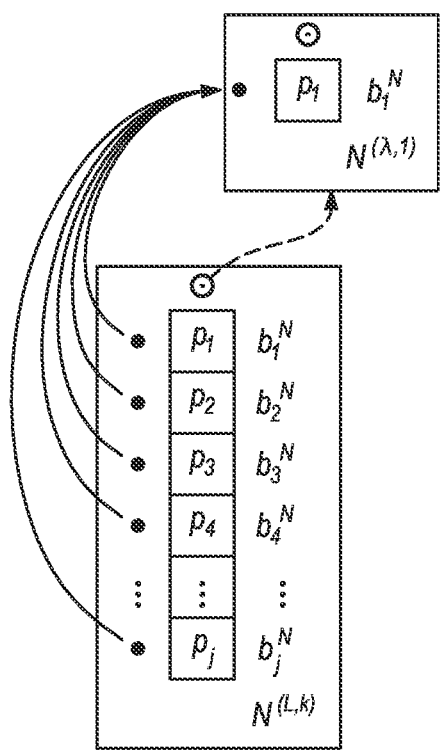
FIG. 4C illustrates a j to one, or prior-type connection in a PYP, in which every draw in the child node shares the same parent draw in the parent node.

FIG. 4C illustrates a j to one, or prior-type connection, in which every draw in the child node shares the same parent draw in the parent node. Here, table counts may be summed across all children. This is the one-to-all case.

Figure 4D:
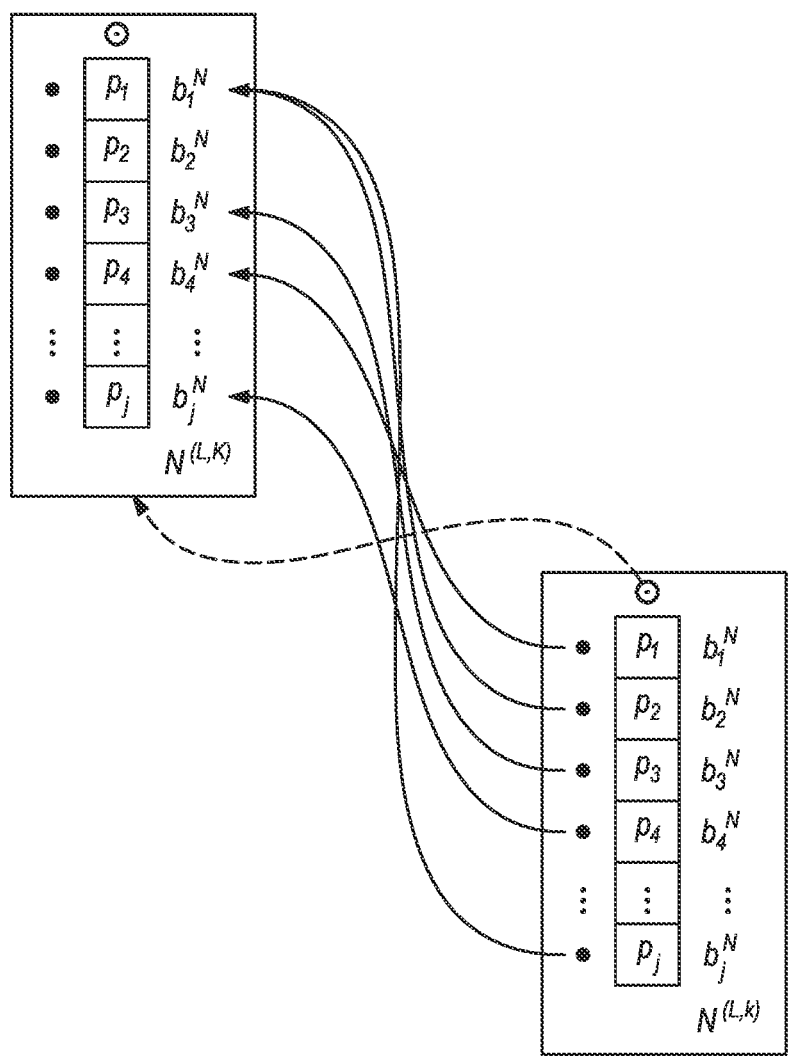
FIG. 4D illustrates a j to j', or group-type, connection in a PYP.

FIG. 4D illustrates a j to j', or group-type, connection. Here each draw in the child node may have an arbitrary parent draw in the parent node. This assignment may represent sampling for a random variable. Each parent must therefore sum over a variable (and potentially empty) number of children. This is the arbitrary case.

Figure 4E:
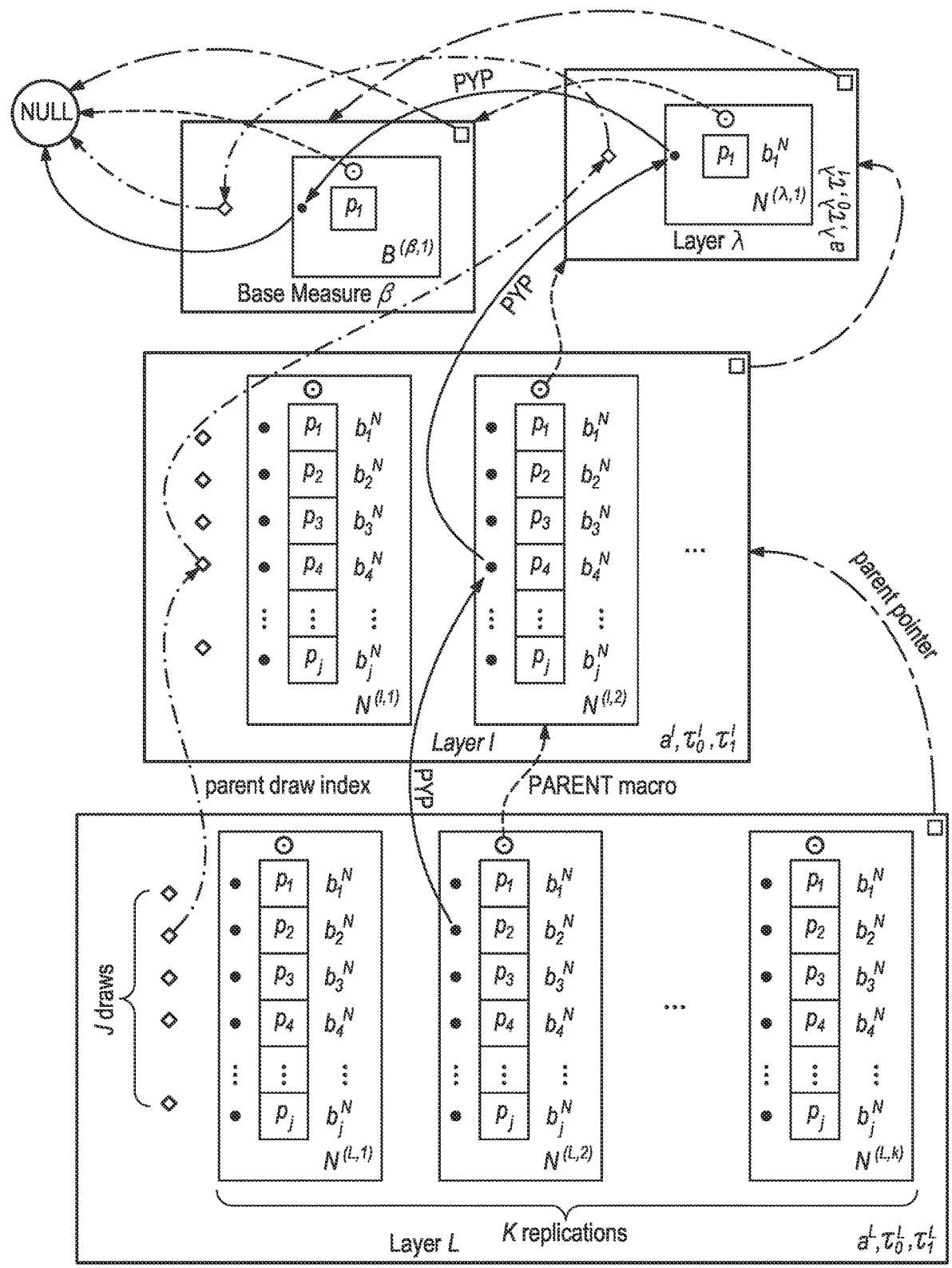

FIG. 4E illustrates, in an embodiment, the relation between probability distributions p and parent distributions in the Pitman-Yor-Process (PYP) with some associated concentration b and discount a. Probability distributions may be organized into nodes, and related nodes into layers. In an embodiment, parent distributions of all distributions in one node must all reside together in another node; and, parent nodes of all nodes in one layer must also reside together in another layer. Probability distributions within a node may be termed draws, while nodes with a layer may be termed replications. In the embodiment of FIG. 4E, the parent draw indices (diamonds) for all draws in a layer must be the same.

Note that the probability distribution over class labels F influences the topic identifier labels M in FIG. 3. Thus, the marginal distribution used to update the feature model B must account for the classifier A. This coupling allows the feature model B to learn features (D) which not only summarize the dataset, but which are most useful for classification. The sampling equation for the topic branch T1 can be expressed as $$P(z_{d,n} \mid w, s, z_{\neg d,n}, \wp) = \frac{P(\ell_d \mid v_A, z, \wp)}{P(\ell_d \mid v_A, z_{\neg d,n}, \wp)} \times \frac{P(z, \{c\}, \{t\} \mid \wp)}{P(z_{\neg d,n}, \{c_{\neg d,n}\}, \{t_{\neg d,n}\} \mid \wp)}$$

Where the second term is computed using the technique described above, and the first term is due to the classifier model A. In the first term, $\ell_d$ represents the set of labels for call d, $v_A$ represents the set of parameters internal to the classifier model, z represents the set of all topic identifiers M, $z_{\neg d,n}$ represents the set of all topic identifiers M, exclusive of the current word n of call d being sampled, and $\wp$ represents the set of prior assumptions in the model (e.g., G, O, and J in the example model shown in FIG. 3). If the classifier is a linear model as shown in FIG. 3, the parameters internal to the classifier model $v_A$ will include a set of topic importances $\eta$ and intercepts b, and the conditional probability $$P(\ell_d \mid v_A, z_{\neg d,n}, \wp) \propto \sigma\left(\ell \times \left[\frac{\eta \cdot c^\theta_{\neg d,n}}{L_d^{1/3}} + b\right]\right),$$

where $c_{\neg d,n}^\theta$ represents the customer counts for the probability distribution over topics D for call d, exclusive of the current word n being sampled, and $L_d$ is the number of words in the transcript for call d, and $$\sigma(x) = \frac{1}{1 + e^{-x}}$$

is the sigmoid function. Scaling the denominator to the ⅓ power may yield more effective predictions, but other choices for this exponent are possible. Valid choices include an exponent of 0, such that the classifier operates on tallies of words in the call, or an exponent of 1, such that the classifier operates on probability distributions over topics, or any value in between.

If we define $$\mathcal{A} \equiv \frac{\eta \cdot c^\theta_{\neg d,n}}{L_d^{1/3}}, f \equiv \frac{L_{d\neg}^{1/3}}{L_d^{1/3}}, \text{ and } \epsilon \equiv \frac{\eta_k}{L_d^{1/3}},$$

then we can write the first term of the marginal probability as $$\frac{P(\ell_d \mid v_A, z, \wp)}{P(\ell_d \mid v_A, z_{\neg d,n}, \wp)} = \frac{1 + e^{-\ell(\mathcal{A}+b)}}{1 + e^{-\ell(\mathcal{A}f+b+\epsilon)}}.$$

This is straightforward to implement in light of the detailed disclosure provided herein, but care must be taken to avoid overflows when the argument to the exponential functions is large.

Multiplying the terms P(N, D, M|O) and P(F|D, E, C2) computed above yields the conditional distribution P(v|O|vA, $\mathcal{D}$) required for the topic branch T1 of the feature model B.

4.2.2.2 Sampling Algorithm for Variables Internal to the Word Branch

In an embodiment, on the word side of the model, prior to training the model, a server computer may split words C1 into two sets of words, first person type words and second person type words. The first person type and second person type refer to types of people for a specific implementation of the model. For example, some businesses may split the calls into caller words and agent words. The model does not depend on the types of people being callers and agents and other implementations may be executed with the model of FIG. 3 for any number of categories.

While the model is described below with respect to person type distinctions, the segregation techniques described herein may segregate words in the model using any type of metadata. For example, instead of caller-specific and agent-specific distributions of words, there may be seasonal distributions of words, regional distributions of words, or any combination of segregated distributions. As is described above, a benefit of the feature model B of FIG. 3 is its scalability to multiple topic segregations. Thus, there could be a distribution of words for each combination of caller/agent and season.

Due to the conditional independence implied by the graph in FIG. 3, the conditional distribution P(v$_j$|$\mathcal{D}$) reduces to P(L1, L2, K1, K2, H, I|J, C1). This can be computed using the same methodology as P(N, D, M|O) above, only with extra terms corresponding to the extra layers of hierarchy for this branch of the model.

Since the nodes L1 and L2 of the graph in FIG. 3 represent a large quantity of data, they may be inefficient to store as described above. Thus, the data may be stored in a more efficient sparse format. For example, rather than storing the full table counts for each topic, for each call, we may instead store a table indicator (u) defined as a Boolean variable indicating whether or not a data point created a new table count: $t_k = \Sigma_{n=1}^{c_k} u_{n,k}$. Thus, the data storage is proportional to the number of words in the dataset, rather than the full V×K×D terms required to store the full node, where V is the size of the vocabulary, K is the number of topics, and D is the number of calls. When required by the algorithm, individual table indicators may be sampled according to the following equation:

$$u_{d,n} \sim \text{Bern}\left(\frac{t_{z_{d,n}}}{c_{z_{d,n}}}\right).$$

Where Bern is the Bernoulli distribution, $z_{d,n}$ is the topic identifier M for the current word n of call d, and c and t refer to the customer and table counts, respectively.

Multiplying the terms derived for the topic branch T2 and word branch T1 yields the desired distribution $P(v_B|v_A, \mathcal{D})$. Summing this over all possible values for each of the table indicators u yields a marginal distribution for each word's topic identifier M. This is a standard categorical distribution and is straightforward to sample from. Once a new topic identifier M is chosen, the algorithm may involve going back to the topic branch T1 and conditioning its distribution to obtain P(N, D|O, M). The table indicators u may be sampled from this distribution to update the branch. An analogous process may be used to update the word branch T2.

5.0 Topic Display

In an embodiment, after a semi-supervised topic model is trained, as described above, it is ready for use; it may receive call transcript data, or access stored call transcript data, and determine which topics were discussed on a call. After processing call transcript data for a target call and determining one or more topics of the call, embodiments may digitally store the target call transcript data with additional data indicating the one or more topics of the target call. Some embodiments may display the topics of the call in a Graphical User Interface (GUI) along with some call transcript data or other identifying information.

In an embodiment, the server computer provides topic information to the client computing device. The topic information may indicate, for each of a plurality of topics, a number or percentage of calls received for that topic over a particular period of time. For example, the server computer may send calls received for different topics on an hourly, daily, weekly, or monthly basis. The server computer may additionally provide options to customize the topic information. For example, the server computer may provide an interface where a client computing device specifies a start time/date and an end time/date. The server computer may provide the topic information for the specified period of time by identifying each call received during that period of time and incrementing a topic counter for each topic when a call was identified as corresponding to the topic.

The server computer may provide graphs that depict the topic information to the client computing device. For example, the server computer may generate a histogram with the x-axis corresponding to time intervals, such as hours, days, or weeks, and the y-axis corresponding to a number or percentage of calls that were received for a topic. Separate histograms may be provided for each topic and/or a joint histogram may be generated which includes a plurality of bars for each time interval, each of the plurality of bars corresponding to a different topic of a plurality of topics.

In an embodiment, the server computer further identifies the words that correspond to each of the topics, such as by computing the probabilities for words individually and identifying corresponding probabilities for different topics. As the topics may not be named in advance, specifying the words with the highest probabilities of being associated with a topic allow for easier identification of the topic. If the server computer receives input naming a particular topic, the server computer may update stored data to include the name of that topic for other data sent to the client computing device.

The server computer may use the identified words for each of the topics to generate a word bubble display for the client computing device. The word bubble display may include a plurality of bubbles, each corresponding to a different topic. The size of the bubble may correspond to the frequency with which the topic is discussed, with larger bubbles corresponding to topics that are discussed more frequently and smaller bubbles corresponding to topics that are discussed less frequently. The bubbles may include words inside them that correspond to the topic of the bubble. For example, a bubble for the topic of purchasing a vehicle may include the words "car", "price", "financing", and "credit".

The server computer may provide a graphical user interface to the client computing device with the topic information. The graphical user interface may provide charts and graphs for different and/or customizable time periods corresponding to call data provided by the client computing device. The graphical user interface may comprise insights to the call data, such as origins and destinations of the calls within different topics retrieved from metadata. The graphical user interface may additionally provide options to rename topics and/or merge topics.

In an embodiment, the topic information is provided to a real-time bidding platform where users bid on calls based on keywords of the call or other information. The topic information may additionally be used to intelligently route calls from a source to a destination.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
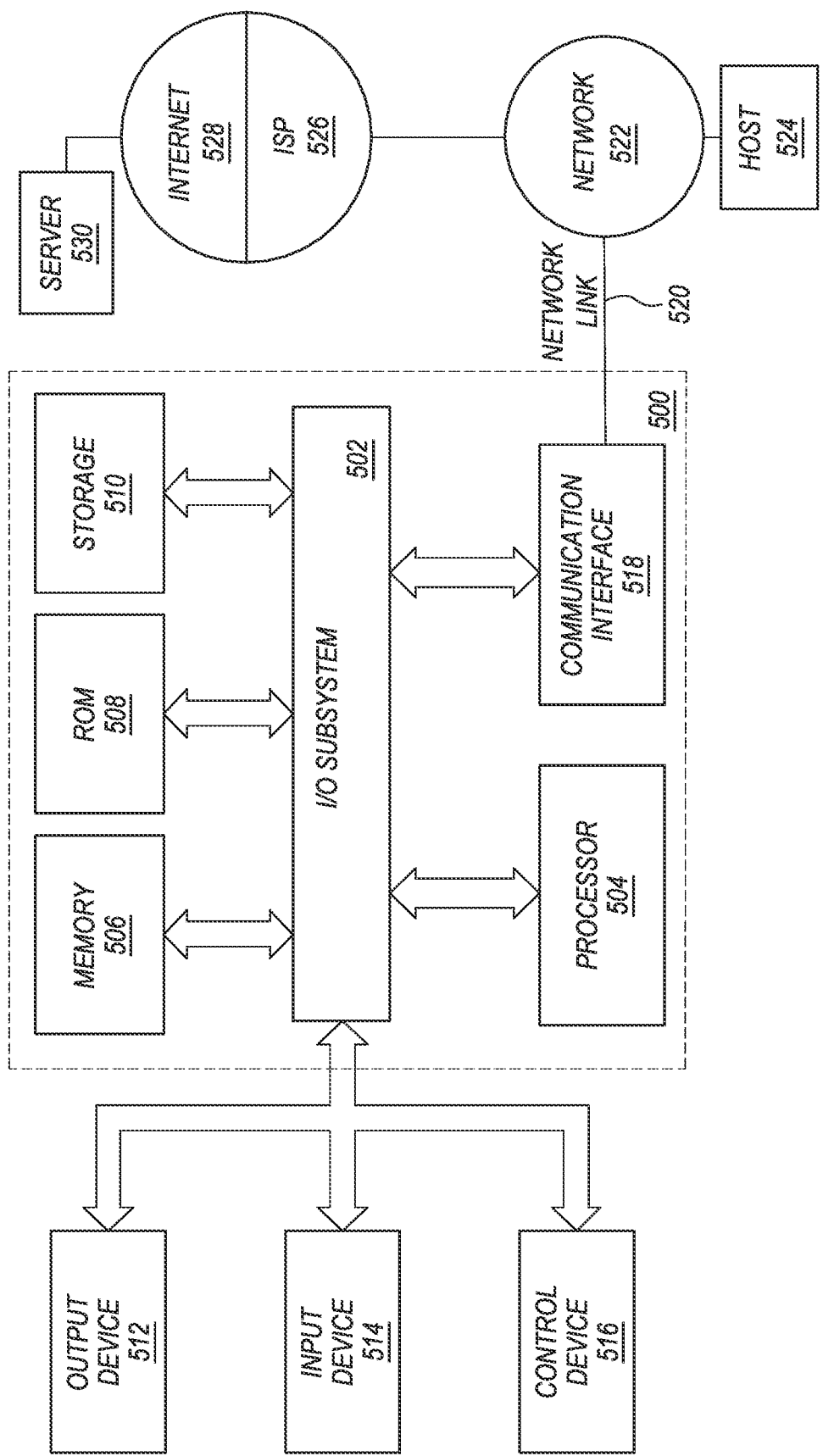
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, comprising:
digitally storing first call transcript data that is associated with an observed label of a set of observed labels, the first call transcript data comprising an electronic digital representation of a verbal transcription of a call between a first person of a first person type and a second person of a second person type, the first call transcript data having been created based on speech-to-text recognition of an audio recording of the call, the first call transcript data being divided into first person type data comprising words spoken by the first person in the call and second person type data comprising words spoken by the second person in the call;
digitally generating and storing a machine learning statistical topic model in computer memory, the topic model comprising a word branch, a topic branch, and a classifier that defines a joint probability distribution over topic vectors and observed labels, the classifier being conjoined to the topic branch, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics;
wherein the classifier is a linear classifier that has been trained to use a determined probability distribution of topics and a determined topic importance to determine classifications of target calls;
programmatically training, using a set of call transcript data that includes the first call transcript data, the topic model using the classifier, the set of call transcript data comprising at least one call transcript data not associated with an observed label;
receiving target call transcript data comprising an electronic digital representation of a verbal transcription of a target call;
programmatically determining, using the topic model and the linear classifier, at least one of one or more topics of the target call and a classification of the target call;
digitally storing the target call transcript data with additional data indicating at least one of the one or more topics of the target call or the classification of the target call;
wherein the word branch and the topic branch are conditionally independent;
wherein the topic model uses probability distributions to infer any data missing from the first call transcript data.

2. The method of claim 1, the word branch of the topic model being configured to model words as parts of phrases and the topic branch of the topic model being configured to model transition probabilities among topics.

3. The method of claim 1, the topic model additionally modeling the first call transcript data as a function of a plurality of topics which are modeled as a function of a probability distribution of topics.

4. The method of claim 3, the probability distribution of topics being modeled as a function of an inferred prior probability distribution which is modeled as a function of a flat prior distribution.

5. The method of claim 4, the probability distribution of topics being modeled as a function of the inferred prior probability distribution using a Pitman-Yor Process and the inferred prior probability distribution being modeled as a function of the flat prior distribution using a Pitman-Yor Process.

6. The method of claim 1, the third probability distribution of words for each topic being modeled as a function of an inferred prior probability distribution which is modeled as a function of a flat prior distribution.

7. The method of claim 6, the third probability distribution of words for each topic being modeled as a function of the inferred prior probability distribution using a Pitman-Yor Process and the inferred prior probability distribution being modeled as a function of the flat prior distribution using a Pitman-Yor Process.

8. The method of claim 1, determining the one or more topics of the call using the topic model by inverting a Bayesian Belief Network using Bayes' theorem.

9. The method of claim 1, the linear classifier comprising one of a Finnish Horseshoe Model, an L2 Logistic Regression, or a Logistic Regression using a Horseshoe Potential.

10. The method of claim 9, the linear classifier being a Finnish Horseshoe Model and wherein a t parameter of the Finnish Horseshoe Model is inferred.

11. The method of claim 1, training the topic model involving a Rao-Blackwellization process and using a Hamiltonian Monte Carlo algorithm to update the classifier.

12. The method of claim 1, the first person type being a caller type and the second person type being an agent type.

13. The method of claim 1, further comprising providing, to a client computing device, topic information indicating, for each of a plurality of topics, a number or percentage of calls received for that topic over a particular period of time.

14. One or more non-transitory storage media storing instructions which, when executed by one or more processors, cause the one or more processors to execute:

digitally storing first call transcript data that is associated with an observed label of a set of observed labels, the first call transcript data comprising an electronic digital representation of a verbal transcription of a call between a first person of a first person type and a second person of a second person type, the first call transcript data having been created based on speech-to-text recognition of an audio recording of the call, the first call transcript data being divided into first person type data comprising words spoken by the first person in the call and second person type data comprising words spoken by the second person in the call;

digitally generating and storing a machine learning statistical topic model in computer memory, the topic model comprising a word branch, a topic branch, and a classifier that defines a joint probability distribution over topic vectors and observed labels, the classifier being conjoined to the topic branch, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics;

wherein the classifier is a linear classifier that has been trained to use a determined probability distribution of topics and a determined topic importance to determine classifications of target calls;

programmatically training, using a set of call transcript data that includes the first call transcript data, the topic model using the classifier, the set of call transcript data comprising at least one call transcript data not associated with an observed label;

receiving target call transcript data comprising an electronic digital representation of a verbal transcription of a target call;

programmatically determining, using the topic model and the linear classifier, at least one of one or more topics of the target call and a classification of the target call;

digitally storing the target call transcript data with additional data indicating at least one of the one or more topics of the target call or the classification of the target call;

wherein the word branch and the topic branch are conditionally independent;

wherein the topic model uses probability distributions to infer any data missing from the first call transcript data.

15. The media of claim 14, further comprising sequences of instructions which, when executed using the one or more processors, cause the one or more processors to execute determining the one or more topics of the call using the topic model by inverting the topic model using a Bayesian Belief Network.

16. The media of claim 14, the linear classifier comprising one of a Finnish Horseshoe Model, an L2 Logistic Regression, or a Logistic Regression using a Horseshoe Potential.

17. The media of claim 14, further comprising sequences of instructions which, when executed using the one or more processors, cause the one or more processors to execute training the topic model using a Rao-Blackwellization process and a Hamiltonian Monte Carlo algorithm to update the classifier.

18. The media of claim 14, the first person type being a caller type and the second person type being an agent type.

19. The media of claim 14, further comprising sequences of instructions which, when executed using the one or more processors, cause the one or more processors to execute providing, to a client computing device, topic information indicating, for each of a plurality of topics, a number or percentage of calls received for that topic over a particular period of time.

20. A system comprising:

one or more processors;

a memory storing instructions which, when executed by the one or more processors, causes the one or more processors to execute:

digitally storing first call transcript data that is associated with an observed label of a set of observed labels, the first call transcript data comprising an electronic digital representation of a verbal transcription of a call between a first person of a first person type and a second person of a second person type, the first call transcript data having been created based on speech-to-text recognition of an audio recording of the call, the first call transcript data being divided into first person type data comprising words spoken by the first person in the call and second person type data comprising words spoken by the second person in the call;

digitally generating and storing a machine learning statistical topic model in computer memory, the topic model comprising a word branch, a topic branch, and a classifier that defines a joint probability distribution over topic vectors and observed labels, the classifier being conjoined to the topic branch, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics;

wherein the classifier is a linear classifier that has been trained to use a determined probability distribution of topics and a determined topic importance to determine classifications of target calls;

programmatically training, using a set of call transcript data that includes the first call transcript data, the topic model using the classifier, the set of call transcript data comprising at least one call transcript data not associated with an observed label;

receiving target call transcript data comprising an electronic digital representation of a verbal transcription of a target call;

programmatically determining, using the topic model and the linear classifier, at least one of one or more topics of the target call and a classification of the target call;

digitally storing the target call transcript data with additional data indicating at least one of the one or more topics of the target call or the classification of the target call;

wherein the word branch and the topic branch are conditionally independent;

wherein the topic model uses probability distributions to infer any data missing from the first call transcript data.

* * * * *